Figure 1:
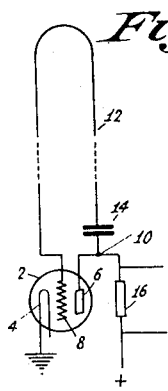

Feb. 6, 1934.   J L. FINCH ET AL   1,945,545
FREQUENCY CONTROL SYSTEM
Filed May 16, 1929   2 Sheets-Sheet 1

INVENTORS
JAMES L. FINCH AND JAMES W. CONKLIN
BY
ATTORNEY

Feb. 6, 1934.    J. L. FINCH ET AL    1,945,545
FREQUENCY CONTROL SYSTEM
Filed May 16, 1929    2 Sheets-Sheet 2

INVENTORS
JAMES L. FINCH AND JAMES W. CONKLIN
BY
ATTORNEY

Patented Feb. 6, 1934

1,945,545

UNITED STATES PATENT OFFICE 1,945,545

FREQUENCY CONTROL SYSTEM

James L. Finch and James W. Conklin, Rocky Point, N. Y., assignors to Radio Corporation of America, a corporation of Delaware Application May 16, 1929. Serial No. 363,660

37 Claims. (Cl. 250—36)

This invention pertains to a frequency control system and particularly relates to one wherein for frequency control and stabilization a long line is utilized; and, one object of this invention is, therefore, to provide a method and means involving the use of an electrical line for regeneratively amplifying oscillations. By regeneration is meant that a portion of the output of an asymmetric device is fed to the input thereof for amplification, or for the purpose of amplifying to such a degree that sustained oscillations result in the output circuit of the device.

Ordinarily the asymmetric device used in connection with this invention takes the form of an electron discharge device or vacuum tube. For the purpose of generating oscillations a portion of the output of the tube is fed to the input thereof; and, heretofore, in order to maintain constant the frequency of the oscillations generated, crystals and intricate tuning devices have been resorted to. As already indicated to some degree, one object of this invention is to provide a new and useful method and means for feeding back energy in such a device, which will eliminate the expensive and difficult to adjust method and means heretofore known for regeneration; and further, in the system devised in accordance with this invention, the frequency of the oscillations produced is maintained constant regardless of load variations in the output circuit of the oscillator, or in other words, the system is made frequency stable by this invention.

According to this invention, between a point in, or associated with the output circuit or circuits of an asymmetric device and a point in or associated with the input circuit thereof, there is inserted a relatively long, preferably aperiodic, line, of such length that for a desired frequency energy transferred over the line from the output circuit to the input circuit bears such phase relation, at the time it becomes effective in the input circuit, relative to the phase at that instant of the energy at the output point referred to, that regenerative action takes place. Thus where a single vacuum tube is used, a line is connected between the anode and control electrode thereof in a manner such that potentials transferred over the line reach the control electrode 180 degrees out of phase with reference to potentials appearing at the anode. In this case the line is made substantially a whole number of half wave lengths long and in order to obtain the desired regenerative phase relationships it is made substantially an odd number of half wave lengths long, the wave length taken, being the one corresponding to a frequency for which it is desired that selective regenerative amplification take place.

Then again it may be desirable to utilize a plurality of asymmetric devices for amplification or for the production of constant frequency oscillations, in which case, according to this invention, a long line is again utilized for feed back purposes. In the event that an even number of asymmetric devices or tubes is utilized the line is connected from the output circuit of the last device to the input circuit of the first device, and is of a length equal to an even number of half wave lengths. When an odd number of tubes is utilized the line is made an odd number of half wave lengths long in order to effect correct phase relationship.

It is further proposed to use, in accordance with this invention a line connecting a point associated with the output circuit of an asymmetric device to the input circuit thereof such that the line is reflectionless or aperiodic; that is to say, unidirectional in conducting energy between the two circuits. This is done by terminating the line at the point where it is to feed energy to the oscillator by an impedance or resistance equivalent to the surge or characteristic impedance of the line.

For the desired regenerative effects it is preferable, not only to have a line of proper length, but also to have all of the energy fed back to the input circuit of the asymmetric device, fed back over the line. Accordingly a further object of this invention is to provide means whereby, especially at high frequencies, feed back through paths other than the line is obviated.

Then again it is often desirable to utilize harmonics of a generated wave. Accordingly, a further object of this invention is to provide a line for the purposes already outlined which may also be utilized for the regenerative amplification of harmonics.

Still another object of this invention is to provide a line for the purposes hereinbefore stated which shall be electrically long and yet physically short, and means in connection therewith for preventing changes in the length of the line with variations in ambient temperature.

Figure 2:
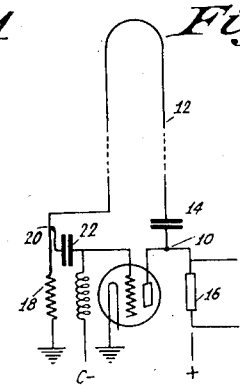
Figure 3:
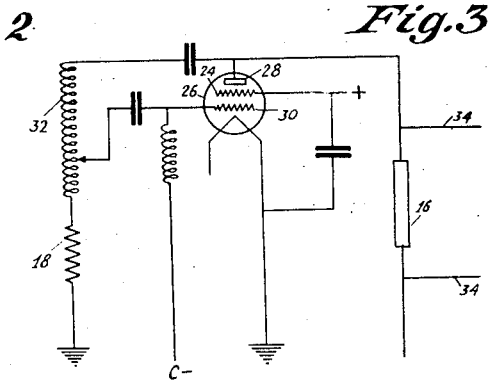
Figure 4:
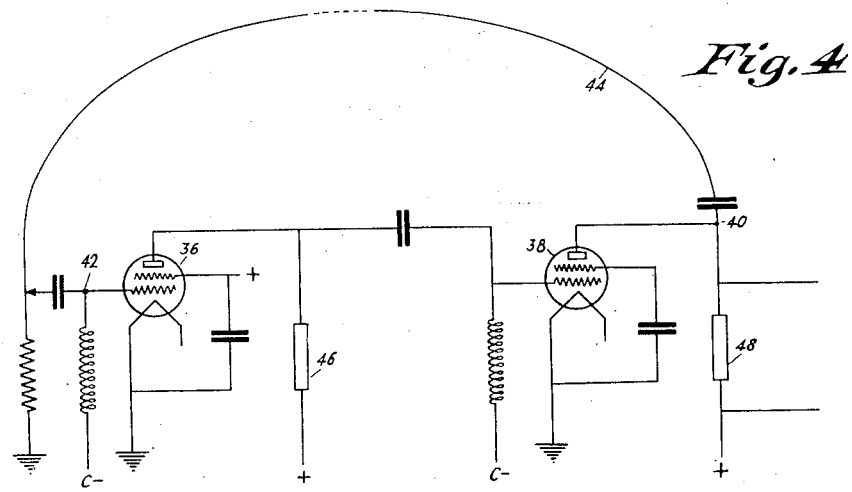
Figure 5:
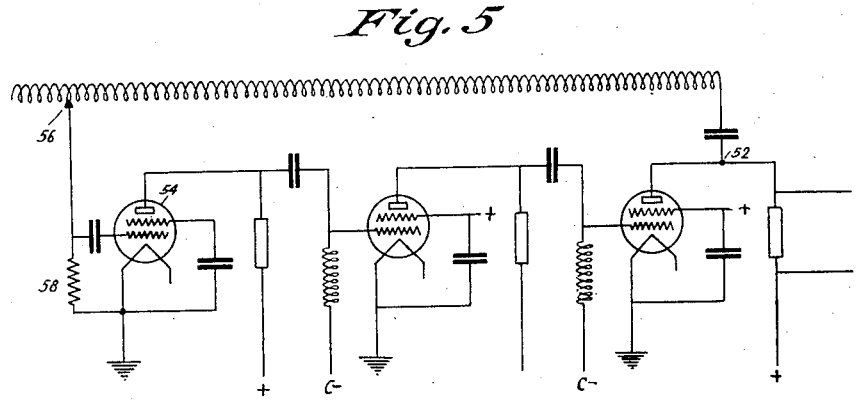

In accordance with the practice of the United States Patent Office the novel features of this invention are set forth in the appended claims. However, the invention may be most clearly understood both as to its organization and method of operation by referring to the accompanying drawings, in which Figure 1 is a diagram illustrating the manner in which a long line may be utilized in connection with an asymmetric device for frequency stabilization and control, Figure 2 illustrates a manner in which the line may be made to have an aperiodic characteristic, Figure 3 shows the use of a line, electrically long but physically short in connection with a screen grid tube whereby feed back other than over the line is prevented, Figure 4 shows the use of an electrically long line in a feed back system utilizing an even number of tubes, Figure 5 shows the manner in which an electrically long line is utilized for regenerative purposes in connection with a feed back system involving an odd number of asymmetric devices, Figure 6 broadly shows the manner in which harmonics may be regeneratively amplified by the use of an electrically long line, Figure 7 indicates the method of feeding back, on an electrically long line, a second harmonic, and Figure 8 indicates a construction, according to this invention, of an electrically long, but physically short, line.

Turning to Figure 1 there is indicated an asymmetric device 2, in this case an electron discharge device, having a cathode 4, of any well known type, anode 6 and a control electrode 8. For the production of sustained oscillations by means of tube 2 it will be necessary that the grid 8 and plate 6 fluctuate in potential 180 degrees out of phase for a desired frequency.

In order to cause this phase relationship for the production of sustained oscillations or for selective amplification, according to this invention, a long line is connected from point 10 associated with the output circuit of electron discharge device 2 to a point associated with the input circuit thereof, here, the input terminal of control electrode 8. By making the line 12 an odd number of half wave lengths long of a frequency desired, it will be seen that potential variations occurring at point 10 will appear on grid 8 a time later, because of the time required to travel over line 12, so as to be opposite in phase to potential fluctuations occurring at point 10. For any other frequency of potential fluctuations the line 12 will not be of the correct length to give proper phase relationship and hence, other frequencies will be discriminated against. The frequency for which the line 12 is made an odd number of half wave lengths long, may be regeneratively amplified to any desired extent by the suitable choice of values for the electrical elements involved so that either amplification or sustained oscillation results.

The anode potential is kept from grid 8 by means of a blocking condenser 14. The output of tube 2 is taken from an impedance 16, in the form of a resistance, a tunable circuit, or any other well known expedient, in the output circuit of tube 2.

In order to prevent reflection, line 12 is terminated by an impedance 18 (see Figure 2) in the form of a resistance corresponding in value to the surge, or characteristic impedance of line 12. By means of a slider arrangement 20 the exact point for the obtaining of the proper phase relationship may readily be obtained.

As the line is aperiodic and accordingly non-discriminating as to the wave shapes transferred thereby, and as it is desired to utilize certain wave shapes only, a device should be utilized in connection therewith or in connection with the input or output circuits of the arrangements shown, to select a particular wave shape. By making impedance 16 a tuned circuit, the arrangement becomes selective to a wave form desired; and hence, for this reason 16 is made preferably a tunable circuit.

Tuned circuit 16, when the line is made more than one half wave length long, also introduces a succession of impulses in periodic relation to the line, also highly desirable for excellent operation.

It should be noted that when resonant or other energy storing circuits are utilized in connection with this invention, the storing circuits should be given a high decrement by loading or otherwise, in order to make the input energy comparable to the stored energy, for it is the phase of this input or regenerated energy that is determined by the line and from this energy is the frequency stabilizing effect derived.

The arrangements shown in Figures 1 and 2 are adapted for use only for lower frequencies. This is due to the fact that at the lower frequencies the potential variations appearing at the anodes will not pass to the control electrodes of the tubes by way of the anode grid capacity, because of the high impedance offered thereby; but will preferably travel through the blocking condensers 14, 22 over line 12 through the control electrodes of the tubes. At the higher frequencies, however, the high frequency potentials appearing at points 10 pass readily through the anode grid capacity of the tubes, thereby preventing proper operation of the system, for example, allowing of generation of parasitics.

To avoid this defect the line is preferably used, according to this invention, in connection with a screen grid tube, as shown for example in Figure 3. By virtue of the screen grid 24 of tube 26 there cannot be feed back of energy to grid 30 through the anode grid capacity of tube 26, but all of the energy must pass thereto by way of the long line 32, an odd number of half wave lengths long.

Line 32 is shown in this figure as being electrically long but physically short; that is to say, it is made in the form of a long coil mounted on an insulating rod such as glass, quartz, bakelite, or wood etc. In some cases it may be advisable to cast the entire coil, as mounted, in a dielectric material such as sulphur, or to immerse it in a fluid dielectric such as oil, glycerine, pure water, etc. Such a line would have a very low velocity along the length of the rod and thereby presents a line of great electrical, but of small physical length. By placing the whole line and its covering in an enclosure and temperature controlling the same, the effect of variations in the ambient temperature are avoided and further insures frequency stabilization.

The line 32, of Figure 3, as in Figure 1, is terminated by a resistance 18 corresponding to its surge impedance; and, the output of tube 26 is fed to some utilization circuit by means of terminals 34 connected across an impedance 16 in the output circuit of tube 26.

It may be mentioned here that although the anode control electrode capacity has been taken care of in the arrangement shown in Figure 3, the control electrode-cathode capacity has not been taken into account. However, the effect of this capacity is not disastrous to frequency stabilization and control but simply tends, as do blocking condensers 14, 22 to shorten the line. Hence, a little longer line would have to be used where these capacities are present than would be true of the case where the line was used in connection with a theoretically perfect tube, that is to say, a tube wherein there are no interelectrode capacities.

Figures 4 and 5 indicate the manner in which a long line is utilized for frequency control of a plurality of cascade connected asymmetric devices. In Figure 4, an even number of electron discharge devices 36, 38 are used, and, as the potential at point 40 fluctuates in phase with the potential appearing at point 42, and out of phase with potentials on the anode of 36, line 44 for regenerative amplification is made an even number of half wave lengths long.

It is to be here noted that point 40 is to be considered as a point associated with the output circuit of tube 36 in a manner similar to that in which point 10 is considered as associated with the output circuit of tube 2 of Figure 1. Energy, of course, is transferred from the output circuit of tube 36 to the control electrode of tube 38 by means of coupling impedance 46. The output of the system may be transferred to some utilization circuit as at 48.

Figure 5 illustrates an arrangement similar to that shown in Figure 4 with the exception that an odd number of tubes are cascade connected for regenerative amplification. Electrically long but physically short line 50 is connected from point 52 of the last tube to the control electrode of the first tube 54. Since an odd number of tubes is used, point 52 fluctuates in potential 180 degrees out of phase with the potential appearing on the control electrode of tube 54 for a desired frequency, and hence, the active length of line 50 should be adjusted by slider 56 until it is the correct whole number of fractional parts of a wave length of a desired frequency long to give selective regenerative effects at that frequency. Here it would be made substantially an odd number of half wave lengths long.

In Figure 5 the termination impedance 58 is not connected to the extreme end of line 50; but, as shown it is in series with the connection to point 56 which determines the effective length of the line to be placed in circuit with the vacuum tubes. As indicated, of course, suitable potentials are supplied to the various electrodes.

Figure 6:
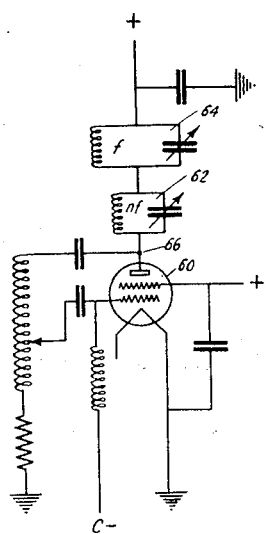

The long line described hereinbefore may also be used for the regenerative amplification of harmonics. The general arrangement is shown in Figure 6. In the output circuit of electron discharge device 60 are connected in series two tunable circuits 62, 64; 62 being tuned to the desired harmonic and circuit 64 being tuned to the fundamental. The line is connected between point 66 and control electrode of tube 60 as shown. In this manner, by the choice of a suitable length of line, in this case an odd number of half wave lengths long, the wave length taken being that of the fundamental, and by virtue of the tuning of tunable circuit 62, tuned to $n$ times the fundamental, in the output circuit of tube 60, a harmonic corresponding to $n$ times the fundamental, where $n$ is any whole number, will be regeneratively amplified along with the fundamental.

Figure 7:
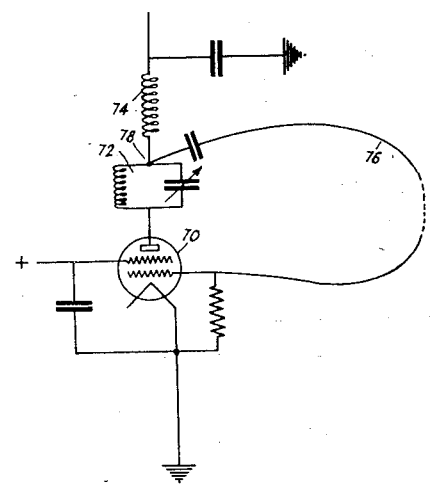

The arrangement for regeneratively amplifying harmonics is not necessarily limited to the scheme shown in Figure 6. For example, for regeneratively amplifying a second harmonic an arrangement such as shown in Figure 7 may be utilized. In the output circuit of tube 70 there is connected in series a tunable circuit 72 tuned to the fundamental, and a choke coil 74. By connecting line 76 at point 78 the second harmonic will be fed over line 76 to the control electrode of tube 70 to be regeneratively amplified.

Figure 8:
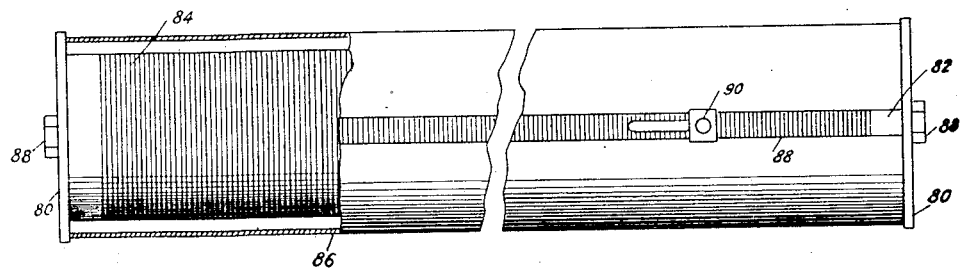

A possible line construction is shown in Figure 8. Turning to that figure, between end pieces 80 of any suitable material there is mounted an insulating form 82 of glass, bakelite or other material, upon which the line 84 is wound. Line 84 may, of course, be either of bare wire or insulated wire and may be wound as a single layer, in several layers, or bankwound, depending upon electrical considerations in connection with the design of the line for use as a frequency stabilizer. About the coil and spaced therefrom is a copper or other metallic shield 86 having a longitudinal opening 88 therein to allow of adjustment of a slider connection 90 as well as to reduce eddy current losses therein. One or more sliders 90 may be provided as desired. Shield 86 is grounded for radio frequency current. To either of terminals 88 contact may also be made.

The shield 86 is useful to shield the line from outside disturbances as well as to prevent coupling of the line with nearby circuits. The capacity introduced by the shield decreases the velocity along the axis of the coil, and this capacity may be increased by immersing the coil in solid or fluid dielectrics as indicated hereinbefore.

Of course, the shield and coil need not necessarily be made circular but may be made square or polygonal, for mechanical advantages may present themselves thereby, without altering the line electrically.

Several similar coils may be placed within a single metallic box and connected together serially. In this case only the end coils are provided with sliders, they being unnecessary for the intermediate coils. The box in which the coils are placed is made preferably of metal and grounded. This further tends to shield and protect the line from external disturbances or from improper reaction with its coordinated circuits.

The box or enclosure also offers the possibility of temperature controlling the line, thereby preventing changes in its length with temperature. As the line, when in operation, develops a certain amount of heat, one way of temperature controlling the line would be, then, to allow the box in which the line is placed, to heat up to a certain temperature and then by the provision of thermostatically controlled means, have a door or other member on the box open when that temperature exceeds, and close when the temperature falls below, a desired value. It is also conceivable that a fan may be made to operate in conjunction with the opening of the door for cooling purposes.

Similarly, if found desirable, the thermostatic control means placed within the box may be utilized to control an electric heater turning the same on when the temperature falls below a predetermined value, and off after the temperature rises to that value. It is further conceivable that a thermostatically operated ventilator as already described may be used in connection with the heater.

Still another manner in which the effects of temperature on the length of the line may be avoided is by suitably designing the coil so that temperature has no effect upon it. Thus the coil may be made of special alloys, so chosen with regard to their coefficient of thermal expansion that changes in temperature cause the alloys to neutralize each other as far as their expansive phenomena are concerned, or, the line may be so designed that the changes in electrical constants resulting from change of physical dimensions with temperature will compensate each other.

It may also be possible to so design the coil that the room temperature will suffice to maintain its length correct. In this case, of course, the coil or line will be made of wire sufficiently large so that large amounts of heat are not developed.

Also if found desirable the line after adjustment may be placed within a hermetically sealed container; and further, if desired, the container may be evacuated to any degree; or the container may be filled with a suitable gas.

Having thus described our invention, what we claim is:—

1. In combination, an electron discharge device having an anode a cathode and a control electrode, a circuit having high impedance to high frequency currents interconnecting said control electrode and cathode, a circuit having high frequency impedance interconnecting said anode and cathode, a conductor having substantially uniformly distributed inductance and capacity, a plurality of half wave lengths long at a desired operating frequency connected between said anode and control electrode for feeding back energy from said anode cathode circuit to said control electrode cathode circuit, and, an impedance equal in value to the surge impedance of said conductor connected between the output end of said conductor and said cathode.

2. In combination, an asymmetric device having an input circuit and an output circuit, a long line associated with the input and output circuits of such a length that for a desired frequency potential variations appearing in the output circuit of the device are transferred to the input circuit thereof a time later such that regeneration for substantially only the desired frequency results, and, a resistance substantially equal in value to the surge impedance of said line connected to said line causing energy transfer over said line to be aperiodic.

3. In combination, a vacuum tube having a cathode and three cold electrodes unequally spaced from said cathode and subjected to different polarizing potentials, means connecting one of said cold electrodes to said cathode to prevent interelectrode feed back between the other two cold electrodes, a high frequency impedance connected between each of said other cold electrodes and said cathode, a transmission line a plurality of wave lengths long connected between said cold electrodes to which said high frequency circuits are connected, said line serving to transfer high frequency energy from one of said cold electrodes to the other, and, means connected to the output end of said transmission line rendering energy transfer over said line aperiodic.

4. In combination, an electron discharge device having a cathode and a plurality of cold electrodes unequally spaced from and subject to different polarizing potentials relative to said cathode, a circuit having an appreciable impedance to high frequency currents connected between each of said cold electrodes and said cathode, one of said circuits having inductance and capacity and being resonant to approximately a desired frequency of operation, means for rendering ineffectual the capacity existing between said cold electrodes, and, a transmission line, having uniformly distributed inductance and capacity, and a plurality of half wave lengths long at a desired operating frequency connected between said cold electrodes for establishing desired energy transfer therebetween.

5. In apparatus for regeneratively amplifying or sustaining high frequency oscillations, an electron discharge device having an electron emitting cathode and a plurality of cold electrodes unequally spaced from and subjected to different polarizing potentials relative to said cathode, a circuit having appreciable impedance at the desired operating frequency connected between each of said cold electrodes and said cathode, one of said circuits having inductance and capacity for approximately fixing the frequency of operation of said device, and, a transmission line a plurality of half wave lengths long at the desired operating frequency coupled to a plurality of electrodes of said electron discharge device for accurately fixing the frequency of operation thereof.

6. In apparatus for regeneratively amplifying or sustaining high frequency oscillations, the combination of a plurality of electron discharge devices each having anode cathode and control electrodes, the cathodes of said devices being connected together, a circuit having appreciable impedance at a desired operating frequency connected between the control electrode and cathode and between the anode and cathode of each of said devices, one of said circuits having inductance and capacity for approximately establishing the frequency of operation of said electron discharge devices, and, a transmission line a plurality of half wave lengths long at a desired operating frequency coupled to a plurality of said electrodes for accurately fixing the frequency of operation thereof.

7. The combination as claimed in claim 6 characterized in addition by the fact that means are provided to render ineffectual the capacity existing between the anode and control electrode of at least one of said devices.

8. Apparatus as claimed in claim 6 characterized in addition by the fact that said line is in the form of a coil, the coil being suitably shielded to prevent reaction electrostatically with nearby circuits.

9. Apparatus as claimed in claim 6 characterized in addition by the fact that means are provided for preventing the effects of capacity existing between the anode and control electrode of each of said devices and further characterized by the fact that the line is connected between an electrode of one device and an electrode of a different one of said devices.

10. In combination, a vacuum tube having a filament a plate a grid and a screen grid intermediate said grid and plate, means for maintaining said screen grid at ground potential for high frequency currents whereby feed back from said plate to grid through the interelement capacity of said tube is prevented, a circuit having inductance and capacity connected between said plate and cathode, a transmission line a plurality of half wave lengths long at a desired operating frequency connected between said plate and grid, and means terminating the grid end of said line to render energy transfer thereover aperiodic.

11. A high frequency circuit comprising a vacuum tube having a cathode a grid a screen grid and a plate, a circuit having inductance and capacity connected between said plate and cathode, a connection for said screen grid to maintain it at radio frequency ground potential to prevent plate to grid feed back, a transmission line a plurality of half wave lengths long at a desired operating frequency connected between said plate and grid, a condenser in series with said line to prevent the application of plate potential over said line to said grid, and, a resistance substantially equal in value to the characteristic or surge impedance of said line connected between the grid end of said line and said cathode.

12. High frequency apparatus comprising an electron discharge device having an anode a cathode and a control grid, a circuit for rendering ineffectual the capacity existing between said anode and control grid, a circuit having appreciable impedance to high frequency currents connected between said anode and cathode, another circuit having appreciable impedance to high frequency currents connected between said control electrode and cathode, one of said last mentioned circuits including an inductance coil, a transmission line, a plurality of half wave lengths long at a desired operating frequency connected between said anode and control electrode, and, an impedance equal in value to the surge impedance of said transmission line connected to the control electrode end thereof for rendering energy transfer over said line substantially aperiodic.

13. In apparatus of the character described, a screen grid vacuum tube having an input circuit and an output circuit, a long line long, relative to a half wave length at the operating frequency connected to each of said circuits to feed back amplified energy from said output circuit to said input circuit, said line being of such a length as to determine the phase of the energy fed back, the screen grid of said vacuum tube being connected to prevent interelectrode feed back, and an impedance equal in value to the surge impedance of said line connected to the output end of said line and said cathode.

14. A screen grid electron discharge device having input and output circuits and means substantially aperiodic for feeding back amplified energy from said output circuit to said input circuit, said means comprising a long line several half wave lengths long, and a resistance equal in value to the surge resistance of said line connected to the output end of said line, the screen grid of said vacuum tube being connected to prevent feed back of energy other than that along the long line.

15. A screen grid electron discharge device amplifier having input and output circuits and connecting means to feed back energy from said output circuit to said input circuit comprising a long line several half wave lengths long at the operating frequency, means for connecting the screen grid of said electron discharge device to preclude interelectrode feed back, and means to terminate the output end of said line with an impedance of such a value as to cause substantially aperiodic feed back thereover.

16. In high frequency apparatus, an electron discharge device having an anode a cathode and a control electrode, a circuit having inductance and capacity connected between said anode and cathode, said circuit being tuned to a desired frequency of operation, a circuit of high frequency impedance connected between said control electrode and cathode, a transmission line a plurality of half wave lengths long at a desired operating frequency, and means coupling said line to said control electrode and anode in such a way as to preclude the transfer of unidirectional anode potential thereover while allowing the transfer of high frequency energy from said anode cathode circuit to said control electrode.

17. In combination, an electron discharge device having an anode a cathode and a control electrode, a circuit tuned to approximately a desired high frequency, connected between said anode and cathode, an inductance coil connected between said control electrode and cathode, a transmission line a plurality of half wave lengths long at a desired operating frequency, and coupling means for coupling said line to said anode and control electrode in such a way as to preclude the transfer of unidirectional potential from said anode to said control electrode while allowing of the transfer of high frequency alternating energy therebetween.

18. In apparatus of the character described a plurality of cascaded screen grid devices, a transmission line having substantially uniformly distributed inductance and capacity and a plurality of half wave lengths long at a desired operating frequency coupled to electrodes of a plurality of said devices for establishing feed back from one of said devices to another of said devices, a blocking condenser connected in series with the line for precluding the application of biasing potential applied to one of the devices along the line to another device, and an impedance equivalent in value to the surge impedance of said line connected to the output end of the line for rendering energy transfer thereover substantially aperiodic.

19. In high frequency apparatus, a plurality of electron discharge devices each having a cathode and a plurality of cold electrodes, circuits interconnecting said electrodes whereby the output of one of said devices feeds into the input circuit of another of said devices, one of said circuits having inductance and capacity whereby said system operates at approximately a desired operating frequency, and, a transmission line a plurality of half wave lengths long at a desired operating frequency coupled to a plurality of said electrodes for accurately fixing the frequency of operation thereof.

20. In combination, a plurality of electron discharge devices each having an anode a cathode and a control grid, circuits for rendering ineffectual the capacity existing between said anodes and control grids, circuits for coupling said devices together whereby output energy of one device is fed to the input circuit of another device, and, a transmission line a plurality of half wave lengths long at a desired operating frequency connected between an electrode of one of said devices and an electrode of another of said devices, said transmission line acting to transfer energy from said one device to said other device, and an impedance equal in value to the surge impedance of said line connected to the output end of said line.

21. In apparatus of the character described, a plurality of electron discharge devices each having an anode a cathode a control electrode and a screen grid, circuits for maintaining said screen grids at suitable potentials to prevent interelectrode feed back between said anodes and said control electrodes, circuits for cascading said devices whereby output energy of one device is fed into the input circuit of another of said devices, an output circuit connected to one of said devices, said output circuit having inductance and capacity, a transmission line a plurality of half wave lengths long at a desired operating frequency connected between said output circuit and the input circuit of one of said devices, and, an impedance equal in value to the surge impedance of said transmission line for rendering energy transfer along said line substantially aperiodic, said impedance being connected between the output end of said line and the cathode of the first of said devices.

22. In apparatus for generating high frequency oscillations, an electron discharge device oscillator comprising an hermetically sealed container having therein an anode a cathode and a control electrode, a circuit for approximately fixing the frequency of oscillation of said device and, a long line for accurately frequency controlling the oscillations generated by said electron discharge device oscillator coupled thereto, said line being long relative to a half wave length at the operating frequency of said oscillator, energy fed from said oscillator to said line being fed back to the oscillator at the output end of the line with a shift in phase which varies rapidly with a shift in oscillator frequency and in such a direction as to pull the oscillator back in frequency with the desired operating frequency, the absolute shift in phase of the energy so fed back for frequency control being directly proportional to the number of wave lengths contained in the line.

23. In a system for generating high frequency electrical oscillations of substantially constant frequency, a plurality of electron discharge devices, means for coupling the devices together, a circuit connected to one of said devices for approximately fixing the frequency of operation thereof, said devices each comprising an electron emitting cathode a control electrode and an anode contained within an hermetically sealed container, and, a long transmission line, for accurately fixing the frequency of operation of said devices, coupled to said electron discharge device oscillating system, said line being long relative to a half wave length of the desired operating frequency and feeding at its output end control energy to said oscillating system which varies rapidly in phase with a shift in frequency at the input end of said line whereby the control energy fed back to said oscillating system varies rapidly in phase with a shift in frequency with said system and by an amount directly proportional to the number of half wave lengths contained in the line whereby the system is caused to return to a desired operating frequency for which the line is substantially a predetermined number of half wave lengths long.

24. In apparatus of the character described, an electron discharge device oscillator having an input circuit and an output circuit, one of said circuits having inductance and capacity to approximately determine the operating frequency of said oscillator means for preventing the effects of interelectrode feed back of said electron discharge device, and, a long transmission line long relative to a half wave length of the operating frequency, coupling said output circuit to said input circuit, whereby with a shift in frequency away from the desired operating frequency, there is a shift in phase of energy fed back to the oscillator at the output end of the line of a value directly proportional to the number of half wave lengths contained in the line whereby the oscillator is rapidly pulled back into step to oscillate at a desired operating frequency.

25. An oscillating system comprising a plurality of electron discharge devices each comprising an evacuated container wherein are contained an electron emitting cathode, a control electrode, and an anode, means for preventing the effects of interelectrode feed back for said electron discharge devices, an output circuit for said devices, an input circuit for said devices, one of said circuits having inductance and capacity to approximately fix the operating frequency of said devices and means comprising a long transmission line several half wave lengths long at the desired operating frequency coupling said output circuit to said input circuit, for feeding back energy from said output circuit to said input circuit for causing oscillation generation at a desired operating frequency, said line acting, with a shift in frequency away from the desired operating frequency, to feed back control energy with a shift in phase directly proportional to the number of half wave lengths on the line and in such a direction as to rapidly cause the operating system to return to its correct operating frequency.

26. In apparatus for producing electrical oscillations of a desired frequency, an electron discharge device having an anode a cathode and a control electrode, and, a long transmission line, several half wave lengths long at the desired operating frequency, coupling said anode to said control electrode, said line being terminated at its output or control electrode end by an impedance equal in value to the surge impedance of said line, whereby the feed back from the input end of said line to the output end thereof is rendered substantially aperiodic.

27. In a system for generating oscillations, a plurality of coupled electron discharge devices each comprising an anode an electron emitting cathode and a control electrode, means for preventing interelectrode feed back of each of said devices, an output circuit for said devices, an input circuit for said devices, and, a long transmission line several half wave lengths long at the desired operating frequency coupling said output circuit to said input circuit, said line being terminated at its output end, near the point where it is coupled to said input circuit, by an impedance substantially equal in value to the characteristic or surge impedance of said transmission line.

28. Apparatus for generating oscillations substantially constant in frequency comprising an electron discharge device comprising an hermetically sealed container wherein are contained an electron emitting cathode an anode and a control electrode, a tuned output circuit coupled to said anode, and, a long transmission line, several half wave lengths long at the desired operating frequency coupling said anode to said control electrode.

29. Apparatus for generating high frequency oscillations comprising an electron discharge device comprising an hermetically sealed container having therein an electron emitting cathode an anode and a control electrode, a tuned output circuit connected to said anode, a long transmission line long relative to a half wave length at the operating frequency connected to said anode and control electrode, and, a resistance equal in value to the surge impedance of said line connected to said line at the output end thereof, whereby feed back along said line at the desired operating frequency is rendered substantially aperiodic.

30. Apparatus for generating high frequency oscillations comprising an electron discharge device having within an evacuated container an electron emitting cathode an anode and a control electrode, means for preventing the effects of interelectrode feed back of said device, a tuned output circuit connected to said anode, a long transmission line, long relative to a half wave length at the operating frequency, establishing a feed back path between said anode and control electrode, and, a resistance equal in value to the surge impedance of said transmission line terminating said line at its output end.

31. In a system for generating electrical oscillations, a plurality of electron discharge devices each having an evacuated container wherein are contained an electron emitting cathode an anode and a control electrode, a tuned output circuit connected to the anode of one of said devices, an input circuit connected to the control electrode of another of said devices, and a long transmission line coupling said output circuit to said input circuit, said transmission line being long relative to a half wave length at the operating frequency.

32. Apparatus as claimed in the preceding claim wherein means are provided to prevent the effects of interelectrode feed back of said electron discharge devices and said line is terminated at its output end by an impedance equal in value to the surge impedance of said line whereby feed back of said line at the desired operating frequency is rendered substantially aperiodic.

33. Apparatus for generating high frequency oscillations comprising an electron discharge device having within an evacuated container an anode a cathode and a control electrode, a tuned anode circuit connected to said anode, a long transmission line, several half wave lengths long at the desired operating frequency, a reactance coupling one end of said line to said anode, a reactance coupling the other end of said line to said control electrode, a surge impedance substantially equal in value to the characteristic surge impedance of said line connected to the output end of said line, and, means for preventing feed back from said anode to said control electrode by paths other than that along said long transmission line.

34. An oscillation generator comprising an electron discharge device having within an evacuated container an anode a cathode and a control electrode, a tuned circuit connected to said anode, a long transmission line, long relative to a half wave length at the operating frequency connecting said anode to said control electrode, a blocking condenser in series with said transmission line for preventing the application of said anode potential to said control electrode, a resistance equal in value to the surge resistance of said line terminating said line whereby feed back along said line is rendered substantially aperiodic, and, means for preventing feed back from said anode to said control electrode along paths other than said long transmission line.

35. An oscillation generator comprising an electron discharge device having an anode a cathode and a control electrode, a circuit connected between said anode and said cathode having inductance and capacity, said circuit being tuned approximately to a desired operating frequency, and, a transmission line a plurality of half wave lengths long at a desired operating frequency coupled to two electrodes of said device for accurately fixing the operating frequency of said device, the electrical constants of said line and said circuit being so chosen as to make the energy flowing in said line comparable to the energy stored in said circuit.

36. Apparatus as claimed in the preceding claim characterized in addition by the fact that said transmission line is connected between said anode and said control electrode and characterized further by the fact that a circuit is provided for preventing the effects of anode control electrode capacity.

37. An oscillation generator comprising an electron discharge device having a filament a grid a screen grid and a plate, a circuit having inductance and capacity connected between said plate and cathode, said circuit being tuned to approximately a desired frequency of operation, a condenser connected between said screen grid and cathode to prevent plate to grid feed back, a transmission line a plurality of half wave lengths long at a desired operating frequency connected between said plate and control grid, and a resistance connected between the grid end of said line and said cathode, said resistance being substantially equal to the surge resistance of said line.

JAMES L. FINCH.
JAMES W. CONKLIN.